United States Patent
Mackenzie et al.

(10) Patent No.: US 11,831,042 B2
(45) Date of Patent: Nov. 28, 2023

(54) MULTI-TAB BATTERY CELLS FOR IMPROVED PERFORMANCE

(71) Applicant: FORD GLOBAL TECHNOLOGIES, LLC, Dearborn, MI (US)

(72) Inventors: Kevin Mackenzie, Canton, MI (US); Thomas J. Coupar, Ann Arbor, MI (US); Jonathan Barker, Detroit, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 128 days.

(21) Appl. No.: 17/330,981

(22) Filed: May 26, 2021

(65) Prior Publication Data

US 2022/0384917 A1 Dec. 1, 2022

(51) Int. Cl.
*H01M 50/538* (2021.01)
*H01M 50/536* (2021.01)
*H01M 10/0525* (2010.01)

(52) U.S. Cl.
CPC ....... *H01M 50/538* (2021.01); *H01M 50/536* (2021.01); *H01M 10/0525* (2013.01); *H01M 2220/20* (2013.01)

(58) Field of Classification Search
CPC ............. H01M 50/538; H01M 50/536; H01M 10/0525; H01M 2220/20
USPC ....................................................... 429/211
See application file for complete search history.

(56) References Cited

U.S. PATENT DOCUMENTS

| | | | |
|---|---|---|---|
| 8,236,441 B2 | 8/2012 | Gardner et al. | |
| 2013/0216872 A1* | 8/2013 | Fuhr | H01M 10/6561 |
| | | | 429/72 |
| 2019/0126770 A1* | 5/2019 | Koch | H01M 10/049 |
| 2020/0144581 A1 | 5/2020 | Thunot | |
| 2021/0036330 A1* | 2/2021 | Yoshida | H01M 10/4235 |
| 2021/0143466 A1* | 5/2021 | Shin | H01M 50/636 |
| 2022/0200107 A1* | 6/2022 | Tsukamoto | H01M 4/0404 |

FOREIGN PATENT DOCUMENTS

| | | |
|---|---|---|
| CN | 202025654 U | 11/2011 |
| CN | 108520936 A | 9/2018 |
| KR | 20080047165 A | 5/2008 |
| WO | WO 2020/218473 * 10/2020 | ............ H01M 4/02 |

* cited by examiner

*Primary Examiner* — Jonathan G Jelsma
*Assistant Examiner* — Omar M Kekia
(74) *Attorney, Agent, or Firm* — David B. Kelley; Carlson, Gaskey & Olds, P.C.

(57) ABSTRACT

Exemplary battery cell designs, such as those for use within electrified vehicle traction battery packs, for example, may include an electrode assembly that includes a plurality of current collector tabs. The current collector tabs may be arranged in one or more tab groupings when the electrode assembly is positioned in a folded configuration. The current collector tabs of the one or more tab groupings may be joined together to establish an enlarged current collector tab that is larger than any individual one of the current collector tabs of the one or more tab groupings. The enlarged current collector tab is an optimized tab configured to reduce internal resistance, reduce heat buildup, and increase the power capability of the battery cell.

19 Claims, 5 Drawing Sheets

MULTI-TAB BATTERY CELLS FOR IMPROVED PERFORMANCE

TECHNICAL FIELD

This disclosure relates to energy storage devices, and more particularly to battery cells that include multiple current collector tabs for improving battery cell performance.

BACKGROUND

Battery cells are energy storage devices that store electrical energy for powering various electrical loads. For example, the electrical loads of electrified vehicles, such as battery electric vehicles (BEVs), hybrid electric vehicles (HEVs), and plug-in hybrid electric vehicles (PHEVs), are typically powered by a traction battery pack that houses a plurality of battery cells.

SUMMARY

A battery cell according to an exemplary aspect of the present disclosure includes, among other things, an electrode assembly and a plurality of current collector tabs extending from the electrode assembly. In a folded configuration of the electrode assembly, the plurality of current collector tabs are arranged together in one or more tab groupings and are joined together to establish an enlarged current collector tab.

In a further non-limiting embodiment of the foregoing battery cell, the battery cell is a cylindrical lithium-ion cell.

In a further non-limiting embodiment of either of the foregoing battery cells, the battery cell is a prismatic lithium-ion cell.

In a further non-limiting embodiment of any of the foregoing battery cells, the current collector tabs of each of the one or more tab groupings are joined together by a crimp.

In a further non-limiting embodiment of any of the foregoing battery cells, the current collector tabs of each of the one or more tab groupings are joined together by a weld.

In a further non-limiting embodiment of any of the foregoing battery cells, the weld is an arc weld.

In a further non-limiting embodiment of any of the foregoing battery cells, the plurality of current collector tabs are arranged together in at least three spaced apart tab groupings.

In a further non-limiting embodiment of any of the foregoing battery cells, the plurality of current collector tabs are arranged together in at least four spaced apart tab groupings.

In a further non-limiting embodiment of any of the foregoing battery cells, the enlarged current collector tab is larger than any individual one of the plurality of current collector tabs of the one or more tab groupings.

In a further non-limiting embodiment of any of the foregoing battery cells, the enlarged current collector tab is cross-shaped.

In a further non-limiting embodiment of any of the foregoing battery cells, the plurality of current collector tabs are longitudinally spaced apart from one another along a length of the electrode assembly when the electrode assembly is positioned in an unfolded configuration.

In a further non-limiting embodiment of any of the foregoing battery cells, a distance between adjacent tabs of the plurality of current collector tabs increases in a direction extending from a first end to a second end of the electrode assembly.

In a further non-limiting embodiment of any of the foregoing battery cells, the battery cell is part of a traction battery pack.

In a further non-limiting embodiment of any of the foregoing battery cells, the battery cell is part of a traction battery pack of an electrified vehicle.

A method according to another exemplary aspect of the present disclosure includes, among other things, positioning an electrode assembly in a folded position. In the folded position, a plurality of current collector tabs of the electrode assembly are arranged together in one or more tab groupings. The method includes joining together the plurality of current collector tabs to establish an enlarged current collector tab.

In a further non-limiting embodiment of the foregoing method, the method includes positioning the electrode assembly within a can of a battery cell.

In a further non-limiting embodiment of either of the foregoing methods, joining together the plurality of current collector tabs includes crimping the plurality of current collector tabs.

In a further non-limiting embodiment of any of the foregoing methods, joining together the plurality of current collector tabs includes welding the plurality of current collector tabs.

In a further non-limiting embodiment of any of the foregoing methods, welding the plurality of current collector tabs includes arc welding the plurality of current collector tabs.

In a further non-limiting embodiment of any of the foregoing methods, the method includes, prior to joining together the plurality of current collector tabs, bending the plurality of current collector tabs into a bent configuration.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery cell designs, such as those for use within electrified vehicle traction battery packs, for example. Exemplary battery cells may include an electrode assembly that includes a plurality of current collector tabs. The current collector tabs may be arranged in one or more tab groupings when the electrode assembly is positioned in a rolled or folded configuration. The current collector tabs of the one or more tab groupings may be joined together to establish an enlarged current collector tab that is larger than any individual one of the current collector tabs of the one or more tab groupings. The enlarged current collector tab is an optimized tab configured to reduce internal resistance, reduce heat buildup, and increase the power capability of the battery cell. These and other features are discussed in greater detail in the following paragraphs of this detailed description.

Figure 1:
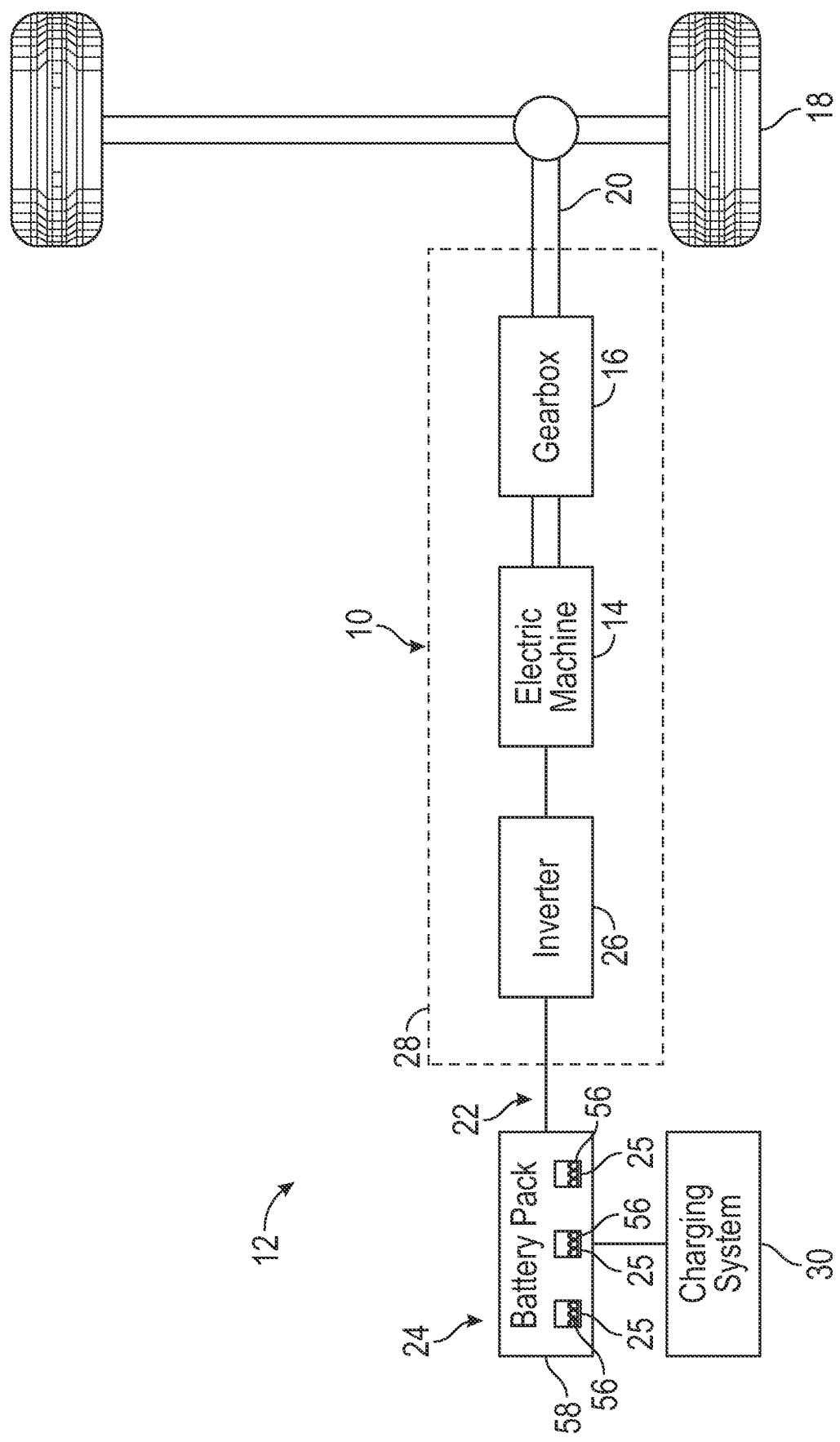
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this exemplary embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a traction battery pack 24 through an inverter 26, which can also be referred to as an inverter system controller (ISC). The electric machine 14, the gearbox 16, and the inverter 26 may be collectively referred to as a transmission 28 of the electrified vehicle 12.

The traction battery pack 24 is an exemplary electrified vehicle battery. The traction battery pack 24 may be a high voltage traction battery pack that includes one or more battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The one or more battery arrays 25 of the traction battery pack 24 may include a plurality of battery cells 56 that store energy for powering various electrical loads of the electrified vehicle 12. The traction battery pack 24 could employ any number of battery cells 56 within the scope of this disclosure. Accordingly, this disclosure should not be limited to the exact configuration shown in FIG. 1.

In an embodiment, the battery cells 56 are lithium-ion cells. However, other cell chemistries (nickel-metal hydride, lead-acid, etc.) could alternatively be utilized within the scope of this disclosure.

In another embodiment, the battery cells 56 are cylindrical or prismatic battery cells. However, other cell geometries could alternatively be utilized within the scope of this disclosure.

An enclosure assembly 58 may house the battery arrays 25 of the traction battery pack 24. The enclosure assembly 58 may include any size, shape, and configuration within the scope of this disclosure.

The electrified vehicle 12 may also include a charging system 30 for charging the energy storage devices (e.g., the battery cells 56) of the traction battery pack 24. The charging system 30 may include charging components that are located both onboard the electrified vehicle 12 (e.g. vehicle charge port assembly, etc.) and external to the electrified vehicle 12 (e.g., electric vehicle supply equipment (EVSE), etc.). The charging system 30 can be connected to an external power source (e.g., a wall outlet, a charging station, etc.) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

Figure 2:
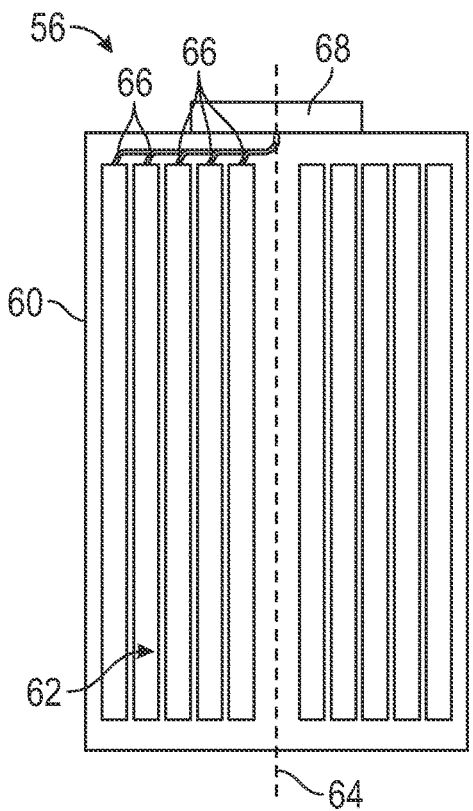
FIG. 2 illustrates an exemplary battery cell.

FIG. 2 illustrates an exemplary battery cell 56 that can be utilized within an electrified vehicle, such as within the traction battery pack 24 of the electrified vehicle 12 of FIG. 1, for example. Although battery cells for electrified vehicle traction battery packs are referenced throughout this disclosure, this disclosure is not limited to battery cells for electrified vehicles. The battery cells described herein could be utilized for any application requiring electrical energy storage.

The battery cell 56 may include a case 60 and an electrode assembly 62 housed within the case 60. In an embodiment, the case 60 is cylindrical shaped for establishing a cylindrical battery cell. However, other shapes for the case 60 (e.g., prismatic shapes) are further contemplated within the scope of this disclosure.

The electrode assembly 62 may sometimes be referred to as a "jelly roll" of the battery cell 56 and may include a cathode, an anode, and one or more separators. The electrode assembly 62 is shown in a rolled or folded configuration in FIG. 2. For example, the electrode assembly 62 may be wound about a centerline axis 64 of the case 60 in order to configure the electrode assembly 62 to be received inside the case 60.

The electrode assembly 62 may include a plurality of current collector tabs 66 for enabling the transfer of energy into and out of the battery cell 56. The total number of current collector tabs 66 may vary per application and is therefore not intended to limit this disclosure.

The current collector tabs 66 may be connected to the cathode of the electrode assembly 62, the anode of the electrode assembly 62, or both. The current collector tabs 66 may connect at one end to the electrode assembly 62 and at an opposite end to a terminal 68 of the battery cell. Although not shown in FIG. 2, an intermediate connecting structure, such as a busbar, for example, could be connected between the current collector tabs 66 and the terminal 68.

The current collector tabs 66 are metallic structures. In an embodiment, the current collector tabs 66 are constructed of aluminum or copper. However, other metallic materials may also be suitable.

Figure 3:
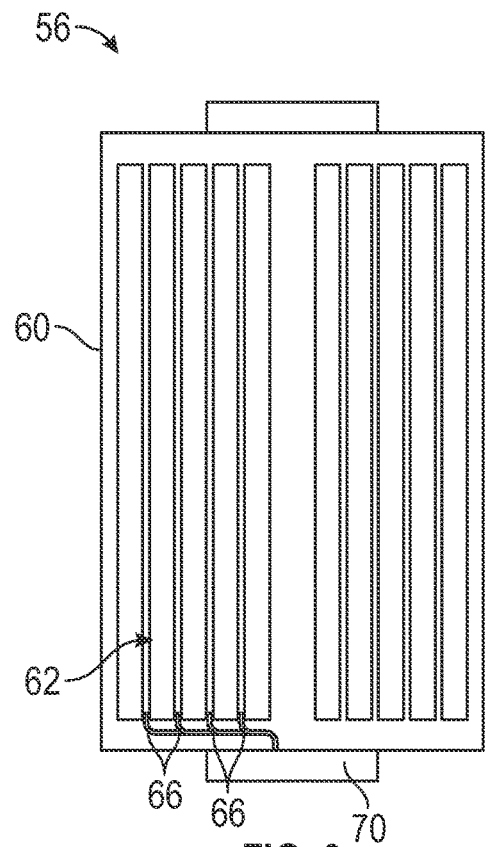
FIG. 3 illustrates another exemplary battery cell.
Figure 4:
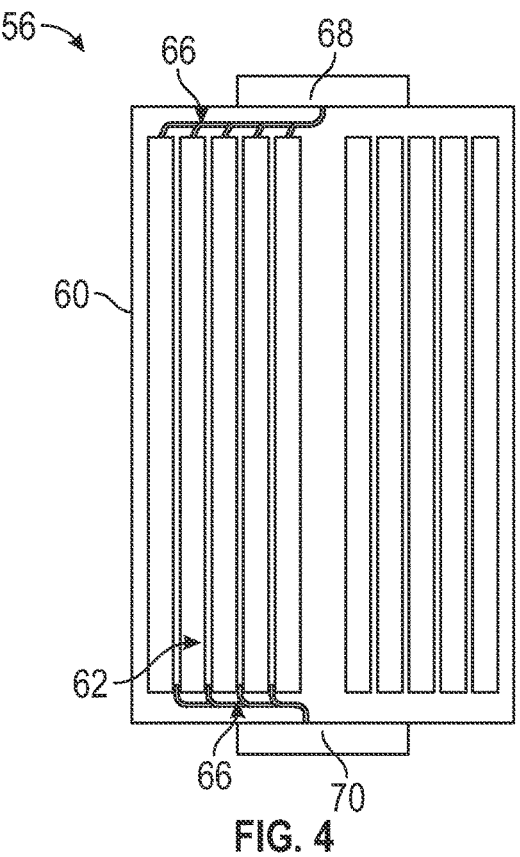
FIG. 4 illustrates another exemplary battery cell.

The specific configuration of the current collector tabs 66 shown in FIG. 2 is exemplary only and is thus not intended to limit this disclosure. For example, the current collector tabs 66 could extend from any portion of the electrode assembly 62. In another embodiment, the current collector tabs 66 may be located on an opposite side of the electrode assembly 62 for connection to another terminal 70 of the battery cells (see, e.g., FIG. 3). In yet another embodiment, current collector tabs 66 may be located on both sides of the electrode assembly 62 for connection to both the terminal 68 and the terminal 70 (see, e.g., FIG. 4).

Figure 5:
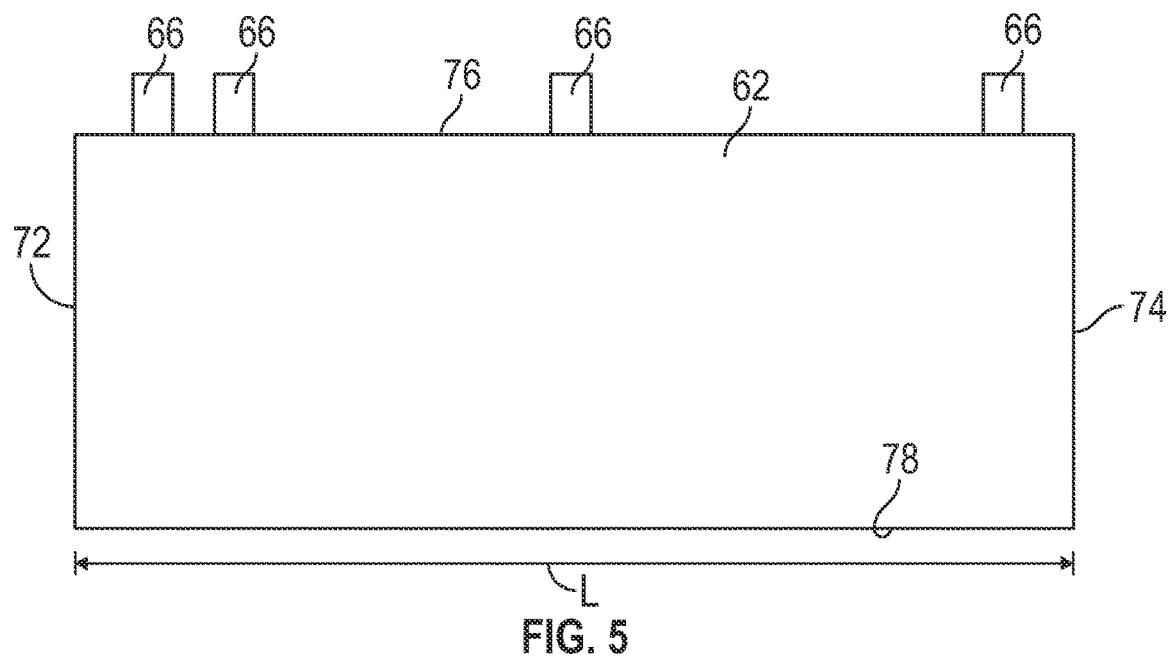
FIG. 5 illustrates an unfolded configuration of an electrode assembly of the battery cell of FIG. 2.

The electrode assembly 62 of the battery cell 56 of FIG. 2 is illustrated in an unrolled or unfolded configuration in FIG. 5. The electrode assembly 62 is therefore shown apart from the case 60 in FIG. 5.

The unfolded electrode assembly 62 may include opposing ends 72, 74, an upper longitudinal side 76, and a lower longitudinal side 78. The electrode assembly 62 extends longitudinally between the opposing ends 72, 74 across a length L. In the illustrated embodiment, the current collector tabs 66 extend from the upper longitudinal side 76. However, the current collector tabs 66 could alternatively or additionally protrude at the lower longitudinal side 78.

The current collector tabs 66 may be spaced apart from one another along the length L of the unfolded electrode assembly 62. The distance between adjacent tabs of the current collector tabs 66 may be pre-calculated such that the current collector tabs 66 are arranged together in a tab grouping when the electrode assembly is positioned in the folded configuration.

Figure 6:
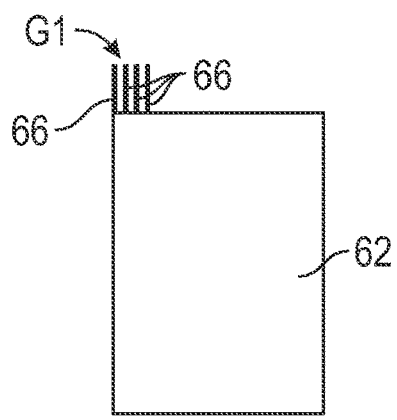
FIG. 6 illustrates a folded configuration of the electrode assembly of FIG. 5.
Figure 7:
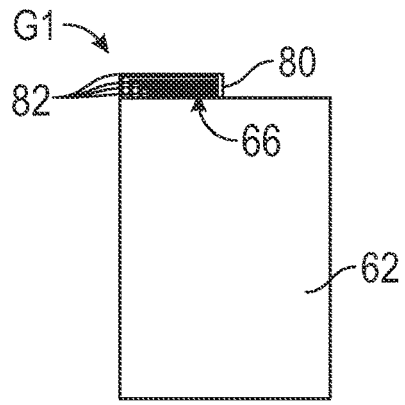
FIG. 7 is a side view of the folded electrode assembly of FIG. 6.
Figure 8:
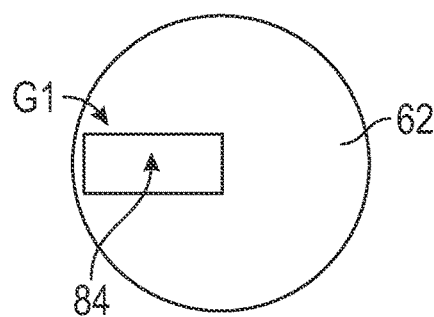
FIG. 8 is a top view of the folded electrode assembly of FIG. 7.
Figure 9:
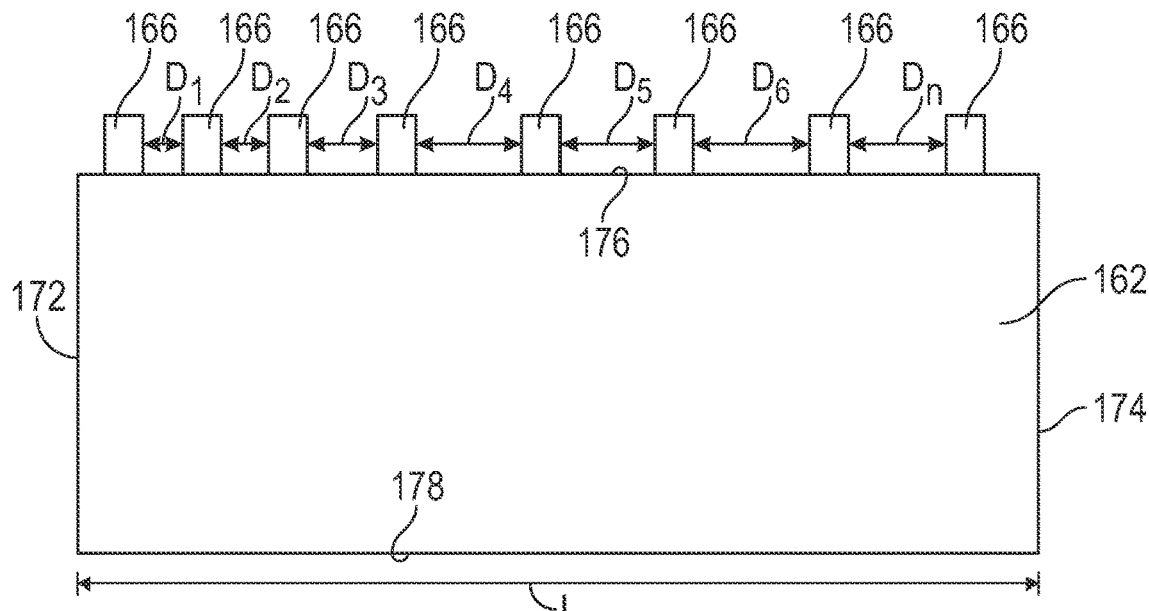
FIG. 9 illustrates an unfolded electrode assembly of another battery cell.

The electrode assembly 62 is shown in the folded configuration in FIGS. 6-8. In the folded configuration, the current collector tabs 66 closely align side-by-side with one another to establish a tab grouping G1. The total number of current collector tabs 66 provided within the tab grouping G1 is not intended to limit this disclosure.

After rolling the electrode assembly 62 to the position shown in FIG. 6, the current collector tabs 66 of the tab grouping G1 may be positioned in a bent configuration such as that shown in FIG. 7. In the bent configuration, each current collector tab 66 may include a bend 82.

The current collector tabs 66 may next be joined together, such as via a connection 80 (see FIG. 7). In an embodiment, the connection 80 is a crimp formed by a crimping process. In another embodiment, the connection 80 is a weld formed by a welding process, such as an arc welding process, for example. Other types of connections are further contemplated within the scope of this disclosure.

Referring now to FIG. 8, once joined together, the current collector tabs 66 of the tab grouping G1 form an enlarged current collector tab 84. The surface area of the enlarged current collector tab 84 is larger than the surface area of any individual one of the current collector tabs 66 of the tab grouping G1. The enlarged current collector tab 84 is therefore an optimized tab that provides the battery cell 56 with reduced internal resistance, reduced heat buildup, and increased power capability compared to battery cells having only a single current collector tab.

FIGS. 9-12 illustrate another exemplary electrode assembly 162 for a battery cell, such as the battery cell 56 of FIG. 2, for example. The electrode assembly 162 is illustrated in an unrolled or unfolded configuration in FIG. 9. The unfolded electrode assembly 162 may include opposing ends 172, 174, an upper longitudinal side 176, and a lower longitudinal side 178. The electrode assembly 62 extends longitudinally between the opposing ends 172, 174 across a length L.

Current collector tabs 166 may extend from the electrode assembly 162. In the illustrated embodiment, the current collector tabs 166 extend from the upper longitudinal side 176. However, the current collector tabs 166 could alternatively or additionally protrude at the lower longitudinal side 178.

The current collector tabs 166 may be spaced apart from one another along the length L in the unfolded configuration of the electrode assembly 162. The distance between adjacent tabs of the current collector tabs 166 may be pre-calculated such that the current collector tabs 166 are arranged together in multiple tab groupings when the electrode assembly 162 is positioned in a folded configuration (see, e.g., FIGS. 10-12).

In an embodiment, the spacing between adjacent tabs of the current collector tabs 166 increases in a left-to-right direction between the opposing ends 172, 174. Thus, a spacing Dn between the two current collector tabs 166 located closest to the end 174 is larger than any of the other spacings $D_1$ to $D_6$ between current collector tabs 166 of the electrode assembly 162.

Figure 10:
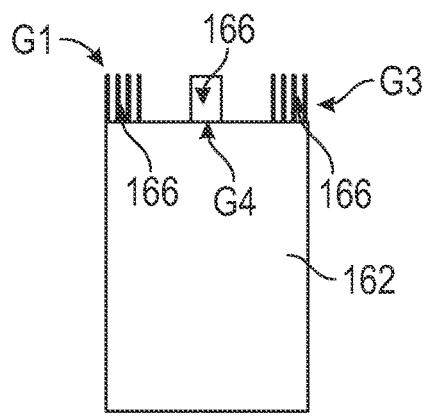
FIG. 10 illustrates a folded configuration of the electrode assembly of FIG. 9.
Figure 11:
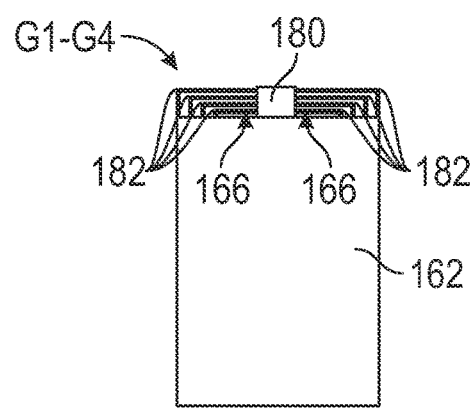
FIG. 11 is a side view of the folded electrode assembly of FIG. 10.
Figure 12:
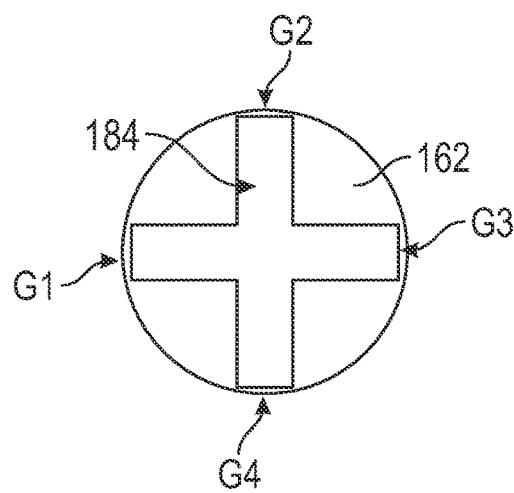
FIG. 12 is a top view of the folded electrode assembly of FIG. 11.

The electrode assembly 162 is shown in the folded configuration in FIGS. 10-12. In the folded configuration, the current collector tabs 166 closely align side-by-side with one another to establish multiple spaced apart tab grouping G1, G2, G3, and G4. Although four tab groupings are illustrated in this embodiment, a greater or fewer number of tab groupings may be provided. Moreover, The total number of current collector tabs 166 provided within each tab grouping G1-G4 is not intended to limit this disclosure.

After rolling the electrode assembly 162 to the position shown in FIG. 10, the current collector tabs 166 of the tab groupings G1-G4 may be positioned in a bent configuration such as that shown in FIG. 11. In the bent configuration, each current collector tab 166 may include a bend 182.

The current collector tabs 166 may next be joined together and joined to the tabs of the other tab groupings, such as via a connection 180 (see FIG. 11). In an embodiment, the connection 180 is a crimp formed by a crimping process. In another embodiment, the connection 180 is a weld formed by a welding process, such as an arc welding process, for example. Other types of connections are further contemplated within the scope of this disclosure.

Referring now to FIG. 12, once joined together, the current collector tabs 166 of the tab groupings G1-G4 may form an enlarged current collector tab 184. In an embodiment, the enlarged current collector tab 184 is cross-shaped. However, other shapes are also contemplated within the scope of this disclosure. The surface area of the enlarged current collector tab 184 is larger than the surface area of any individual one of the current collector tabs 166 of the tab groupings G1-G4. The enlarged current collector tab 184 therefore provides battery cells having reduced internal resistance, reduced heat buildup, and increased power capability compared to battery cells having only a single current collector tab.

Figure 13:
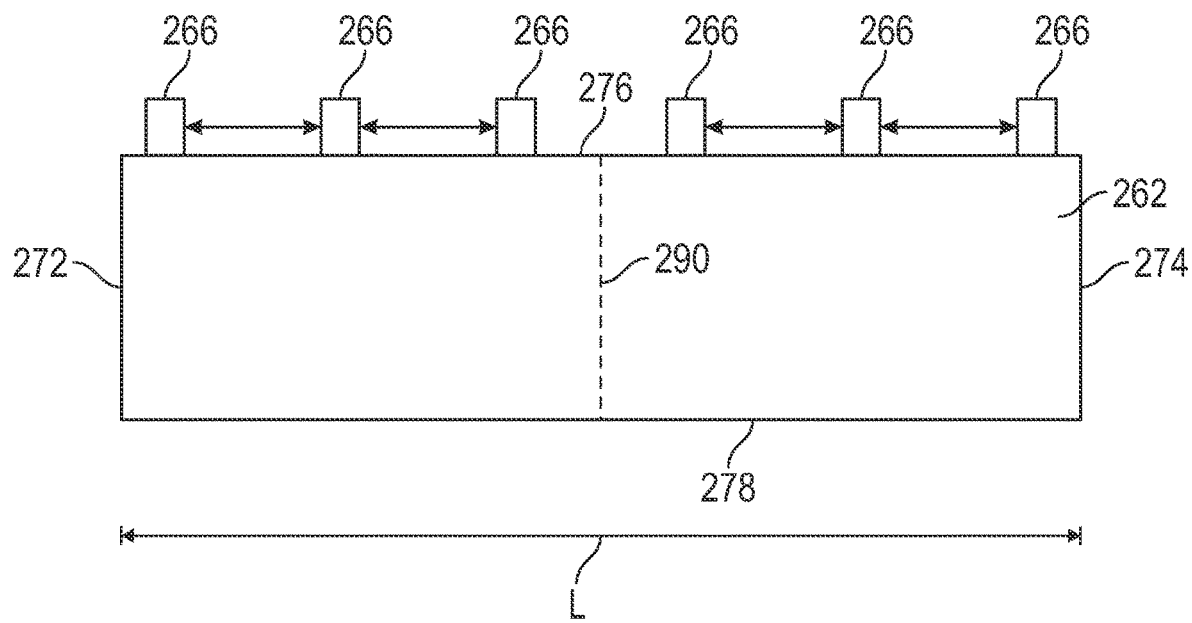
FIG. 13 illustrates an unfolded configuration of an electrode assembly of another battery cell.
Figure 14:
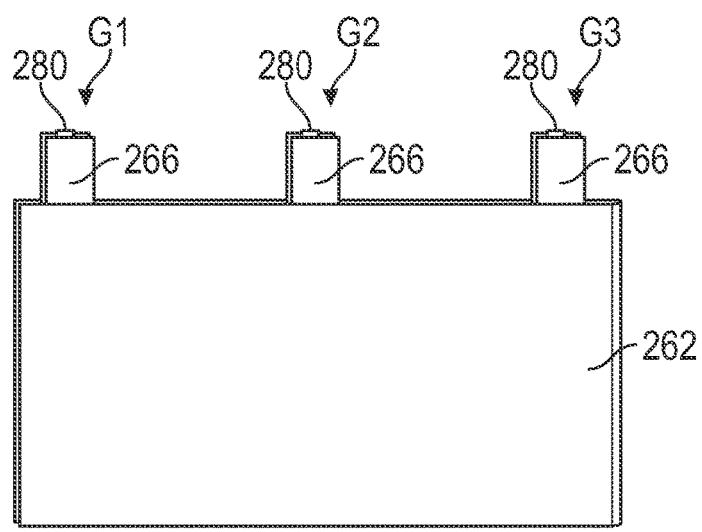
FIG. 14 illustrates a folded configuration of the electrode assembly of FIG. 13.

FIGS. 13-14 illustrate another exemplary electrode assembly 262 for a battery cell, such as a prismatic battery cell, for example. The electrode assembly 262 is illustrated in an unfolded configuration in FIG. 13 and in a folded position in FIG. 14.

The unfolded electrode assembly 262 of FIG. 13 may include opposing ends 272, 274, an upper longitudinal side 276, and a lower longitudinal side 278. The electrode assembly 262 extends longitudinally between the opposing ends 272, 274 across a length L.

Current collector tabs 266 may extend from the electrode assembly 262. In the illustrated embodiment, the current collector tabs 266 extend from the upper longitudinal side 276. However, the current collector tabs 266 could alternatively or additionally protrude at the lower longitudinal side 278.

The current collector tabs 266 may be spaced apart from one another along the length L in the unfolded configuration of the electrode assembly 262. The distance between adjacent tabs of the current collector tabs 266 may be pre-calculated such that the current collector tabs 266 are arranged together in multiple tab groupings G1 to G3 when the electrode assembly 262 is positioned in the folded configuration (see, e.g., FIGS. 10-12). Although three tab groupings are illustrated in this embodiment, a greater or fewer number of tab groupings could be provided within the scope of this disclosure.

The electrode assembly 262 may be positioned in the folded configuration of FIG. 14 by folding the electrode assembly 262 about a fold axis 290, which in this embodiment is a vertical axis. The electrode assembly 262 may be folded multiple times about the fold axis 290. In the folded configuration, the current collector tabs 166 closely align side-by-side with one another to establish the multiple spaced apart tab grouping G1, G2, and G3.

After folding the electrode assembly 262 to the position shown in FIG. 14, the current collector tabs 266 of each tab grouping G1-G3 may be joined together, such as via a connection 280. In an embodiment, the connection 280 is a crimp formed by a crimping process. In another embodiment, the connection 280 is a weld formed by a welding process, such as an arc welding process, for example. Other types of connections are further contemplated within the scope of this disclosure. The joined together current collector tabs 266 may form enlarged current collector tabs that are designed to provides reduced internal resistance, reduced heat buildup, and increased power capability compared to battery cells having only a single current collector tab.

The exemplary battery cells of this disclosure incorporate one or more groupings of current collector tabs. The grouped current collector tabs can be configured to provide an enlarged current collector tab. The enlarged current collector tab reduces internal resistance, reduces heat buildup, and increases the power capability of the battery cells.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery cell, comprising:
an electrode assembly;
a plurality of current collector tabs extending from the electrode assembly,
wherein, in a folded configuration of the electrode assembly, the plurality of current collector tabs are arranged together in one or more tab groupings and are joined together to establish an enlarged current collector tab,
wherein the enlarged current collector tab is cross-shaped; and
a crimp or a weld that joins together the current collector tabs of each of the one or more tab groupings.

2. The battery cell as recited in claim 1, wherein the battery cell is a cylindrical lithium-ion cell.

3. The battery cell as recited in claim 1, wherein the battery cell is a prismatic lithium-ion cell.

4. The battery cell as recited in claim 1, wherein the current collector tabs of each of the one or more tab groupings are joined together by the weld, and the weld is an arc weld.

5. The battery cell as recited in claim 1, wherein the plurality of current collector tabs are arranged together in at least three spaced apart tab groupings.

6. The battery cell as recited in claim 1, wherein the plurality of current collector tabs are arranged together in at least four spaced apart tab groupings.

7. The battery cell as recited in claim 1, wherein the enlarged current collector tab is larger than any individual one of the plurality of current collector tabs of the one or more tab groupings.

8. The battery cell as recited in claim 1, wherein the plurality of current collector tabs are longitudinally spaced apart from one another along a length of the electrode assembly when the electrode assembly is positioned in an unfolded configuration.

9. The battery cell as recited in claim 8, wherein a distance between adjacent tabs of the plurality of current collector tabs increases in a direction extending from a first end to a second end of the electrode assembly.

10. A traction battery pack comprising the battery cell of claim 1.

11. An electrified vehicle comprising the traction battery pack of claim 10.

12. The battery cell as recited in claim 1, wherein the enlarged current collector tab is connected directly to a battery cell terminal.

13. The battery cell as recited in claim 1, wherein a first tab grouping of the one or more tab groupings extends from a first side of the electrode assembly, and a second tab grouping of the one or more tab groupings extends from a second, opposite side of the electrode assembly.

14. The battery cell as recited in claim 13, wherein the first tab grouping is connected directly to a first battery cell terminal, and the second tab grouping is connected directly to a second battery cell terminal.

15. A battery cell, comprising:
an electrode assembly;
a plurality of current collector tabs extending from the electrode assembly and arranged together in multiple tab groupings that are joined together to establish an enlarged cross-shaped current collector tab; and
an arc weld that joins the current collector tabs of the multiple tab groupings together.

16. A method, comprising:
positioning an electrode assembly in a folded position,
wherein, in the folded position, a plurality of current collector tabs of the electrode assembly are arranged together in one or more tab groupings; and
joining together the plurality of current collector tabs to establish an enlarged current collector tab,
wherein the enlarged current collector tab is cross-shaped,
wherein joining together the plurality of current collector tabs includes arc welding the plurality of current collector tabs.

17. The method as recited in claim 16, comprising positioning the electrode assembly within a can of a battery cell.

18. The method as recited in claim 16, wherein joining together the plurality of current collector tabs includes crimping the plurality of current collector tabs.

19. The method as recited in claim 16, comprising, prior to joining together the plurality of current collector tabs, bending the plurality of current collector tabs into a bent configuration.

* * * * *